(12) United States Patent
Lai

(10) Patent No.: US 9,063,223 B2
(45) Date of Patent: Jun. 23, 2015

(54) NAVIGATION DEVICE AND METHOD

(75) Inventor: Ying-Lin Lai, Taipei (TW)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 825 days.

(21) Appl. No.: 12/736,923

(22) PCT Filed: Dec. 29, 2008

(86) PCT No.: PCT/EP2008/068324
§ 371 (c)(1),
(2), (4) Date: Jan. 6, 2011

(87) PCT Pub. No.: WO2010/075879
PCT Pub. Date: Jul. 8, 2010

(65) Prior Publication Data
US 2011/0112765 A1 May 12, 2011

(51) Int. Cl.
G01C 21/00 (2006.01)
H04H 20/74 (2008.01)
G01S 19/25 (2010.01)

(52) U.S. Cl.
CPC ..................... *G01S 19/252* (2013.01)

(58) Field of Classification Search
CPC .......................................................... G01C 21/00
USPC ............................................................ 701/213
See application file for complete search history.

(56) References Cited

U.S. PATENT DOCUMENTS

| 8,319,684 | B2 | 11/2012 | Wengler et al. |
| 8,493,267 | B2 | 7/2013 | Wengler et al. |
| 2002/0142783 | A1 | 10/2002 | Yoldi et al. |
| 2005/0012661 | A1 | 1/2005 | Halivaara |
| 2006/0214001 | A1* | 9/2006 | Chuang et al. ............ 235/472.01 |
| 2006/0217130 | A1* | 9/2006 | Rowitch et al. ............ 455/456.1 |
| 2008/0031095 | A1 | 2/2008 | Matsuzaki et al. |
| 2008/0048910 | A1 | 2/2008 | Wang et al. |
| 2013/0009810 | A1 | 1/2013 | Rowitch et al. |

FOREIGN PATENT DOCUMENTS

| CN | 101176011 A | 5/2008 |
| CN | 101317101 A | 12/2008 |
| EP | 1887378 | 2/2008 |
| JP | 2007166520 A | 6/2007 |
| JP | 2008002880 A | 1/2008 |
| JP | 2008538170 A | 10/2008 |
| TW | 200844469 A | 11/2008 |
| WO | WO 02077661 | 10/2002 |
| WO | 2006102508 A1 | 9/2006 |
| WO | WO 2006102508 | 9/2006 |
| WO | 2006102508 A1 | 11/2006 |
| WO | 2007069363 A1 | 6/2007 |

* cited by examiner

OTHER PUBLICATIONS

International Search Report

*Primary Examiner* — Helal A Algahaim
*Assistant Examiner* — Charles J Han

(57) ABSTRACT

A navigation device includes a global navigation satellite system (GNSS) receiver for receiving GNSS signals broadcast by satellites of a GNSS, a receiver for receiving location information input by a user, time information and/or wireless network coverage information and a processing device. In at least one embodiment, the processing device is arranged to determine a seed position from the location information input by a user; time information and/or wireless network coverage information and controls the GNSS receiver to acquire GNSS satellites based on the determined seed position.

15 Claims, 14 Drawing Sheets

CI = Cell Identity
MCC = Mobile Country Code
MNC = Mobile Network Code
LAI = Location Area Identification
LAC = Location Area Code
RAC = Routing Area Code
RAI = Routing Area Identification

NAVIGATION DEVICE AND METHOD

FIELD OF THE INVENTION

This invention relates to navigation devices and to methods for navigation devices. Illustrative embodiments of the invention relate to portable navigation devices (so-called PNDs), in particular PNDs that include Global Navigation Satellite System (GNSS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GNSS signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM, CDMA and the like.

PND devices of this type also include a GNSS antenna by means of which satellite-broadcast signals, including location positioning data, can be received and subsequently processed to determine a current location of the device.

The PND device may also include electronic gyroscopes and accelerometers which produce signals that can be processed to determine the current angular and linear acceleration, and in turn, and in conjunction with location information derived from the GNSS signal, velocity and relative displacement of the device and thus the vehicle in which it is mounted. Typically such features are most commonly provided in invehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed, determined by the PND using a GNSS receiver. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

The above-described functionality of the PND requires the PND to determine a position fix using the GNSS receiver. Accordingly, on start up of a PND, the GNSS software establishes a position fix for the device. Delays in obtaining a position fix will result in delays in the PND carrying out/being enabled to carry out the specified functionality, such as determine a navigable route. In certain circumstances it can take a long time to establish a first position fix (time to first fix (TTFF)), such as between several minutes and 1 hour. This problem is particular pronounced when the PND has been switched off and relocated by a great distance before being switched back on (far start), for example, if a user takes the PND with him/her on a long haul flight or during delivery of the PND to a customer.

Referring to FIG. 16, the signal processing for a GNSS receiver is based on channelized architecture. Before allocating a channel to a specific satellite (PRN code), the receiver must know which satellites are currently visible. There are two common operating modes for a GNSS receiver to find the visible satellites. One is referred to as cold start and the other is referred to as warm start.

GNSS receivers typically comprise an almanac containing information on the GNSS satellites, such as satellite status and orbital information. In a warm start, the GNSS receiver combines the information in the stored almanac with the last position computed by the GNSS receiver to compute course positions (i.e. Doppler shift) of all satellites since the PND was switched off and determine the satellites that should be visible at the time the PND is switched on. However, if the PND has been moved a significant distance away from the position it was in when it was turned off, the position information cannot be trusted. For example, if during the time the PND is switched off, the PND is relocated from London to Taipei, when the PND is switched back on, the satellite constellation visible to the GNSS receiver in Taipei will be different to the satellite constellation predicted from the information stored in the almanac.

In a cold start, the receiver does not rely on the information stored in the almanac but searches for the visible satellites from scratch. Such a search can take significant time.

Attempts have been made to reduce the TTFF.

One solution implemented by some GPS providers, for example Broadcom's BCM4750, takes advantage of a 24-channel GPS receiver that searches for all GPS satellites simultaneously regardless of operation modes (i.e. warm start or cold start). However, a receiver having such a high number of channels has increased hardware complexity and power consumption (a rule of thumb is that one channel consumes 1-2 mA during satellite acquisition). Greater hardware complexity will result in greater cost for the GPS receiver. Furthermore, to implement such a solution in known GNSS receivers equipped with 12 to 16 channels requires modification of the hardware (through design and tapeout of a new chip) and cannot be achieved through software/firmware upgrades. For traditional GPS, a 24-channel receiver is sufficient but for future GNSS systems (such as Galileo, GLOSNASS, modernized GPS) a receiver may require many more channels than 24 to be able to search for all satellites simultaneously.

A system developed by Qualcomm, see International Patent Application WO 2006/102508, uses Mobile Country Code information (MCC) to reduce the TTFF in far start cases. MCCs are transmitted by cellular networks and can be used by a GNSS device to identify the country/territory the GNSS device is in and therefore, the location of the GNSS device, even during a far start. Use of MCC can result in a reduction in the TTFF during a far start for most countries, but in some countries with large territories (e.g Russian Federation, United States of America, Canada, People's Republic of China and Republic of Chile) the use of MCC is less effective or may even result in an increase in the TTFF.

A further solution is A-GPS which downloads ephemeris and other information that can be used as an aid to find visible satellites over a cellular network from either the cellular network provider (control plane, CP) or a service content provider (user plane, UP). The drawback of such a technique is that for far start scenarios, the mobile telephone or other cellular device used by the GNSS receiver is likely to be in roaming mode (operating within the cellular network (a visited network) in which the cellular device was not originally registered) and therefore, the downloading of the information is likely to incur significant cost. Furthermore, in the case that the information is provided by the cellular network provider, the home network and the visited network must both be compatible to allow the GNSS receiver to obtain this information and for current cellular networks such compatibility between the networks is not common.

Other GPS receivers automatically reset to a blind search mode when the searching time based on a calculated satellite constellation exceeds a predetermined threshold.

SUMMARY OF THE INVENTION

According to a first aspect of the invention there is provided a navigation device comprises a global navigation satellite system (GNSS) receiver for receiving GNSS signals broadcast by satellites of a GNSS, a wireless receiver or a connection arranged to be connected to a wireless receiver for receiving broadcast signals transmitted by base stations of a wireless network and a processing device arranged to:—
  i) obtain information on a country in which the navigation device is located; and
  ii) selectively, based on the country, obtain from the broadcast signal information on a time zone in which the navigation device is located, determine a seed position from the time zone information; and control the GNSS receiver to acquire GNSS satellites based on the determined seed position.

The invention of the first aspect is advantageous as the time zone information can be used to identify an area in a country in which the navigation device is located, the seed position being a location in that area. Furthermore, the time zone information is selectively used, for example, dependent on whether the country in which the navigation device is located extends across more than one time zone. In this way, the time zone information is only used when further information above and beyond the country is required in order to determine a seed position from which the visible satellites can be determined, avoiding needless processing.

Once an approximate location of the navigation device has been identified, a search for GNSS satellites can be made without having to start from scratch. In particular, the navigation device may have a memory having stored therein map information on the visible GNSS satellites at each possible seed location and the processing device may be arranged (for example, by suitable programming) to use the map information to determine a seed position from the information on the country and time zone in which the navigation device is located. The processing device may be further arranged to determine the visible satellites from the seed position. Carrying out a search for satellites based on a list of visible satellites may reduce the TTFF.

According to a second aspect of the invention there is provided a navigation device comprises a global navigation satellite system (GNSS) receiver for receiving GNSS signals broadcast by satellites of a GNSS, a wireless receiver or a connection arranged to be connected to a wireless receiver for receiving broadcast signals transmitted by base stations of a wireless network and a processing device arranged:—
  i) for the current location, obtain information on the identity of the wireless networks from which the cellular device can receive broadcast signals;
  ii) determine a seed position from the information on the identity of the wireless network(s); and
  iii) control the GNSS receiver to acquire GNSS satellites based on the determined seed position.

The invention of the second aspect is advantageous as the information on the identity of the wireless network(s), for example cellular network(s), from which the wireless device can receive broadcast signals, such as control signals (e.g. BCCH) of a cellular network, can be used to identify an area in which the navigation device is located, the seed position being a location in that area. Once an approximate location of the navigation device has been identified, a search for GNSS satellites can be made without having to start from scratch. In particular, the navigation device may have a memory having stored therein map information on the visible GNSS satellites at each possible seed location and the processing device may be arranged (for example, by suitable programming) to use the map information to determine a seed position from the identity of the wireless network(s) from which the wireless receiver can receive broadcast signals. The processing device may be further arranged to determine the visible satellites from the seed position. Carrying out a search for satellites based on a list of visible satellites may reduce the TTFF.

According to a third aspect of the invention there is provided a navigation device comprises a global navigation satellite system (GNSS) receiver for receiving GNSS signals broadcast by satellites of a GNSS, a user input and a processing device arranged to
  i) obtain information on a location of the GNSS device from the user input;
  ii) determine a seed position from the location information; and
  iii) control the GNSS receiver to acquire GNSS satellites based on the determined seed position.

The invention of the third aspect is advantageous as the location information input by the user can be used to identify an area in which the navigation device is located, the seed position being a location in that area. Once an approximate location of the navigation device has been identified, a search for GNSS satellites can be made without having to start from scratch. In particular, the navigation device may have a memory having stored therein map information on the visible GNSS satellites at each possible seed location and the processing device may be arranged (for example, by suitable programming) to use the map information to determine a seed position from the user input. The processing device may be further arranged to determine the visible satellites from the seed position. Carrying out a search for satellites based on a list of visible satellites may reduce the TTFF.

It will be understood that each seed position is associated with a particular area and GNSS satellites that are visible to the navigation device within that area. For example, the seed position may be a location in a country/territory, in an area defined by a time zone and borders of a country/territory and/or in an area defined by cellular network coverage and borders of a country/territory. For example, the seed position may be a centroid of the country/territory or area.

The navigation device may further comprise memory comprising a list of selected countries and the processing device is arranged to identify from the broadcast signal a country code, for example, if the broadcast signal is a control signal broadcast by a cellular network, a Mobile Country Code (MCC), and, based on whether the country/territory associated with the identified country code corresponds to one of the countries in the list of selected countries, determine the seed position from the time zone information or/and the information on the identity of the wireless network(s).

The list of countries may be a positive list of countries, wherein if the country/territory associated with the identified country code corresponds with a country/territory on the list, the seed position is determined from the time position or/and the information on the identity of the wireless network(s). Alternatively, the list of countries may be a negative list of countries, wherein if the country/territory associated with the identified country code does not correspond to a country/territory on the list, the seed position is determined from the time position or/and the information on the identity of the wireless network(s).

The selected list of countries may comprise a first list of countries, wherein if the country/territory associated with the identified country code corresponds with a country/territory on the first list, the seed position is determined from the time zone information and a second list of countries, wherein, if the country/territory associated with the identified country code corresponds with a country/territory on the second list, the seed position is determined from the information on the identity of the wireless network(s).

The selected list of countries may comprise one or more of Russian Federation, Canada, People's Republic of China, United States of America, Federative Republic of Brazil, Commonwealth of Australia, Republic of India, Argentine Republic, Republic of Kazakhstan, Republic of Sudan, Republic of Chile, People's Democratic Republic of Algeria, Republic of Indonesia, Greenland and Democratic Republic of Congo.

The first list may comprise a list of countries that extend across more than one time zone, for example one or more of Russian Federation, Canada, United States of America, Federative Republic of Brazil, Commonwealth of Australia, Republic of Kazakhstan, Republic of Indonesia, Greenland and Democratic Republic of Congo.

The second list may comprise a list of countries that require more than one seed position because of the countries length, for example one or more of People's Republic of China, Republic of India, Argentine Republic, Republic of Sudan, Republic of Chile, People's Democratic Republic of Algeria.

It has been found that for the current countries of the world, the first and second lists are mutually exclusive, i.e. if a country/territory spans many time zones then the country/territory does not have such a longitudinal extent to require seed positions to be established based on wireless network coverage. However, it will be understood that this may change with changes in country codes and/or the longitudinal extent of a country/territory.

In one embodiment, the memory comprises a data map that maps the country codes, time zone information and/or information on the identity of the wireless network(s) to seed positions, for example a position, such as a centroid, of an area uniquely defined by the country code, time zone information and/or information on the identity of the wireless network(s).

The invention has the advantage in that the time zone information or/and the identify of the wireless network(s) (network coverage information) can be used to identify an approximate location of the navigation device such that, in a far start scenario, the navigation device can quickly identify GNSS satellites that should be visible at the location of the navigation device. In this way, the TTFF may be greatly reduced without significantly increasing power consumption. Furthermore, it may be possible to implement the invention on current navigation devices through a software and/or firmware upgrade. Yet another advantage is that the information required can be obtained from the broadcast signals (e.g. BCCH. P-CCPCH, Synchronisation channel (SynchCh)) broadcast by base stations of wireless networks and therefore, there are no call costs (in particular roaming call costs) for obtaining this information. The navigation device may be implemented without the requirement of a Subscriber Identity Module (SIM). Yet a further advantage is that the broadcast signals can be decoded very quickly resulting in little delay to the initiation of a satellite search based on information provided in the broadcast signal.

In one embodiment, the processing device is arranged to:
i) identify from the broadcast signal a country code and identify a country/territory using the country code,
ii) if the identified country/territory is in an exclusive list of countries, then obtain information on the identity of the wireless networks from which the navigation device can receive broadcast signals and determine a seed position from the information on the identity of the wireless network; else,
   if the identified country/territory extends across more than one time zone then obtain information on a time zone from the broadcast signal and determine a seed position from the country code and the time zone information; else
   determine a seed position from the country code only; and
iii) control the GNSS receiver to acquire GNSS satellites based on the determined seed position.

In one embodiment, the memory of the navigation device has stored therein previous time zone information, wireless network information and/or user input location information and the processing device is arranged to identify from a current broadcast signal received by the navigation device and/or a current user input current time zone information, wireless network information and/or user input location information and if the current time zone information, wireless network information and/or user input location information does not match the previous time zone information, wireless network information and/or user input location information, the processing device determines a seed position from the current time zone information, wireless network information and/or user input location information. If the current time zone information, wireless network information and/or user input location information matches the previous time zone information, wireless network information and/or user input location information, the processing device causes the GNSS receiver to locate GNSS satellites based on last position information stored in memory.

In one embodiment, the GNSS receiver is arranged to locate GNSS satellites using information including an almanac stored in memory containing information about the GNSS satellites.

The wireless receiver may be a cellular device or a connection arranged to be connected to a cellular device for receiving control signals emitted by base stations of a cellular network, a portable television signal receiver, radio receiver or other receiver for receiving broadcast signals comprising time information, wireless network coverage information and/or other suitable location information. For example, the processing device may be arranged to determine a seed position from the television and/or radio channels that it can receive or time information included in the television or radio channels.

According to a fifth aspect of the invention there is provided a method of locating satellites of a global navigation satellite system (GNSS) visible at a location comprising:—
i) receiving broadcast signals emitted by base stations of a wireless network;
iii) obtaining information on a country in which the navigation device is located; and ii) selectively, based on the country, obtaining information on a time zone of the location, determining a seed position from the time zone information, and controlling a GNSS receiver to acquire GNSS satellites based on the determined seed position.

According to a sixth aspect of the invention there is provided a method of locating satellites of a global navigation satellite system (GNSS) visible at a location comprising:—
   i) receiving broadcast signals emitted by base stations of a wireless network;
   ii) for the current location, obtain information on the identity of the wireless network(s) for which broadcast signals have been received;
   iii) determining a seed position from the information on the identity of the wireless networks; and
   iv) controlling a GNSS receiver to acquire GNSS satellites based on the determined seed position.

According to a seventh aspect of the invention there is provided a method of locating satellites of global navigation satellite system (GNSS) visible at a location comprising:—
   i) obtaining information on the location from a user input;
   ii) determining a seed position form the location information; and
   iii) controlling a GNSS receiver to acquire GNSS satellites based on the determined seed position.

According to a eighth aspect of the invention there is provided a data carrier having stored thereon instructions that, when executed by a processing device, cause the processing device to carry out the method of any one of the fifth to seventh aspects of the invention.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be noted, however, that the teachings of the present invention are not limited to PNDs but are universally applicable to any type of processing device that is configured to provide position information using a Global Navigation Satellite System (GNSS). It follows therefore that in the context of the present application, a navigation device is intended to include (without limitation) navigation devices, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
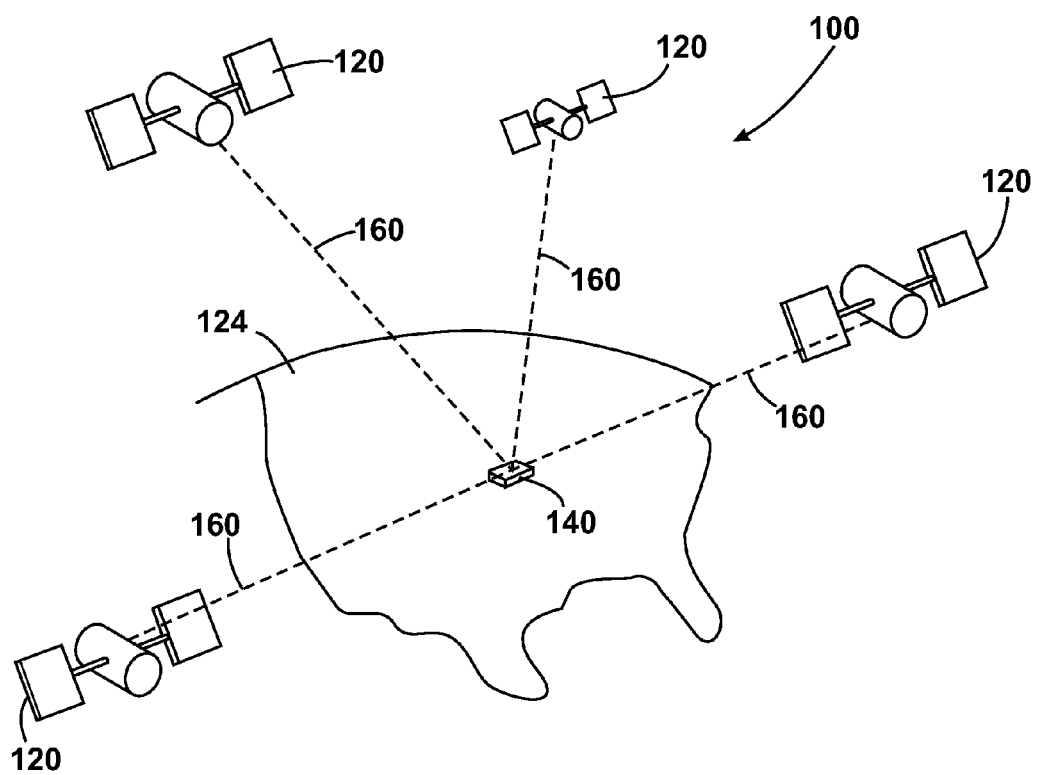
FIG. 1 is a schematic illustration of a navigation device communicating with a Global Navigation Satellite System (GNSS)

With the above provisos in mind, FIG. 1 illustrates an example view of Global Navigation Satellite System (GNSS) 100, usable by navigation devices 140. In general, GNSS is a satellite-radio based navigation system capable of determining continuous position, velocity, time, and in some instances direction information. A GNSS comprise a plurality of satellites 120 in orbit about the earth 124. The orbit of each satellite 120 is not necessarily synchronous with the orbits of other satellites 120 and, in fact, is likely asynchronous. The GNSS satellites relay their location to receiving units 140 via signals 160. The GNSS receiver 140 receives the spread spectrum GNSS satellite signals 160 and determines its position from the position information relayed by the satellites.

The navigation device of the invention may use GPS, formerly known as NAVSTAR, Galileo, GLOSNASS, or any other suitable GNSS. The GNSS incorporates a plurality of satellites 120 which orbit the earth in extremely precise orbits.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GNSS receiver device 140 generally acquires spread spectrum GNSS satellite signals 160 from at least three satellites 120 for the GNSS receiver device 140 to calculate its two-dimensional position by triangulation. Acquisition of an additional signal, resulting in signals 160 from a total of four satellites 120, permits the GNSS receiver device 140 to calculate its three-dimensional position in a known manner.

The GNSS system is implemented when a device, specially equipped to receive GNSS data, begins scanning radio frequencies for GNSS satellite signals. Upon receiving a radio signal from a GNSS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

Figure 2:
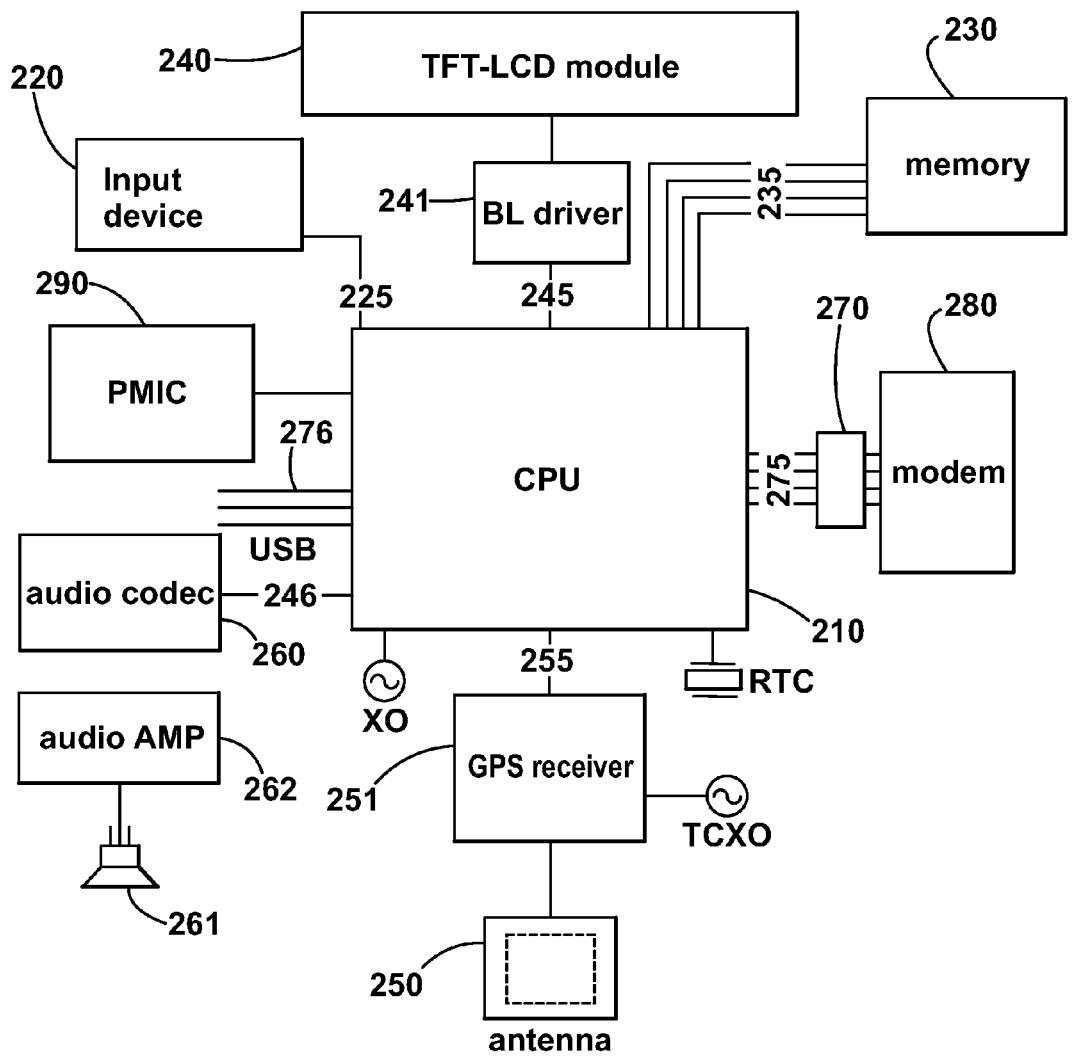
FIG. 2 is a schematic illustration of electronic components arranged to provide a navigation device in accordance with a first embodiment of the invention.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

Figure 5A:
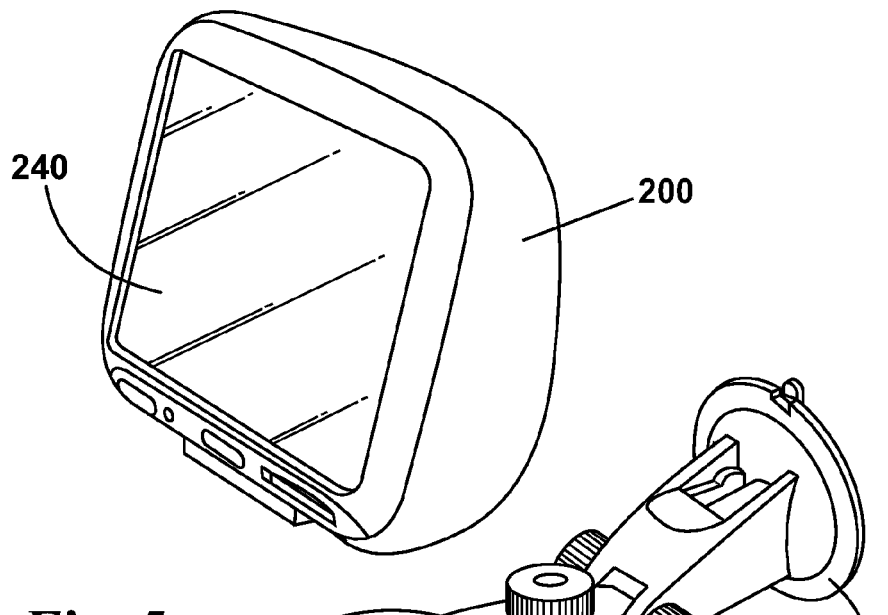
FIGS. 5A and 5B are illustrative perspective views of a navigation device.
Figure 5B:
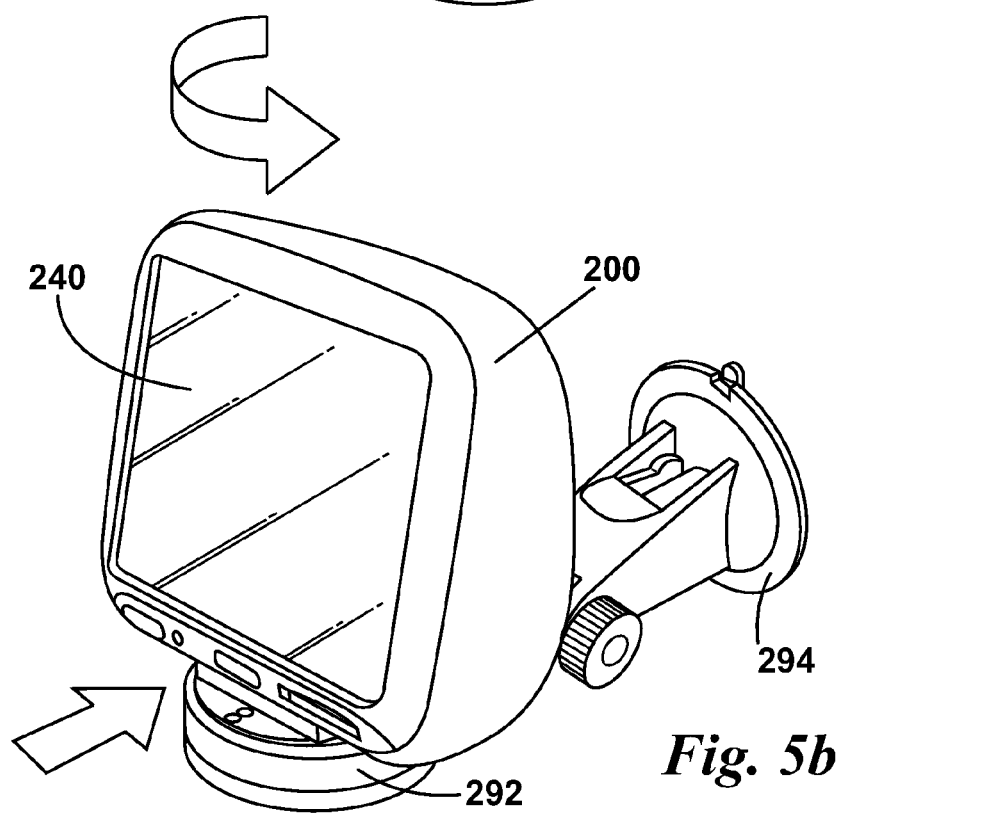

The electronic components of the navigation device 200 are located within a housing such as that shown in FIGS. 5A and 5B. The navigation device includes a processing device 210 connected to an input device 220 and a display screen, in this embodiment an LCD 240, comprising a backlight driver 241 connected with the processing device 210. The input device 220 can include a keyboard device, voice input device, touch panel and/or any other known input device utilised to input information; and the display screen 240 can include any type of display screen such as an LCD display, for example. In this arrangement the input device 220 and display screen 240 are integrated into an integrated input and display device, including a touchpad or touch screen input so that a user need only touch a portion of the display screen 240 to select one of a plurality of display choices or to activate one of a plurality of virtual buttons.

The navigation device may include an output device 260 to 262, for example a loudspeaker 261, an audio amplifier 262 and audio codec 260. The audio device 260 to 262 can produce audio commands for directing the user in accordance with a determined navigable route.

In the navigation device 200, processing device 210 is operatively connected to and set to receive input information from input device 220 via a connection 225, and operatively connected to at least one of display screen 240 and output device 260, via output connections 245 and 246, to output information thereto. Further, the processing device 210 is operably coupled to a memory resource 230 via connection 235. The memory resource 230 comprises, for example, a volatile memory, such as a Random Access Memory (RAM) and a non-volatile memory, for example a digital memory, such as a flash memory.

The navigation device 200 further comprises a connection 270 for detachably connecting to a cellular modem 280, such as a mobile telephone, for receiving braodcast signals, such as BCCH, from base stations of cellular networks. The connection 270 may be used to establish a data connection between the navigation device 200 and the Internet or any other network for example, and/or to establish a connection to a server via the Internet or some other network for example. In another embodiment, device 280 may be a portable television receiver or a radio receiver that can receive TMS/RDS information.

FIG. 2 further illustrates an operative connection between the processing device 210 and a GNSS antenna 250 and receiver 251 via connection 255. The antenna may be a GNSS patch antenna or helical antenna for example.

Further, it will be understood by one of ordinary skill in the art that the electronic components shown in FIG. 2 are powered by power source 290, in this case a power management integrated circuit 290, in a conventional manner.

A wired connection 276, in this embodiment a USB connection, is also provided for connecting the processing device 210 to a computer or the like. Such a connection can be used for software/firmware updates and/or map updates.

As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example by using the mounting device 292/294 shown in FIGS. 5a and 5b. Such a navigation device 200 is then removable from the docked location for portable or handheld navigation use.

Figure 3:
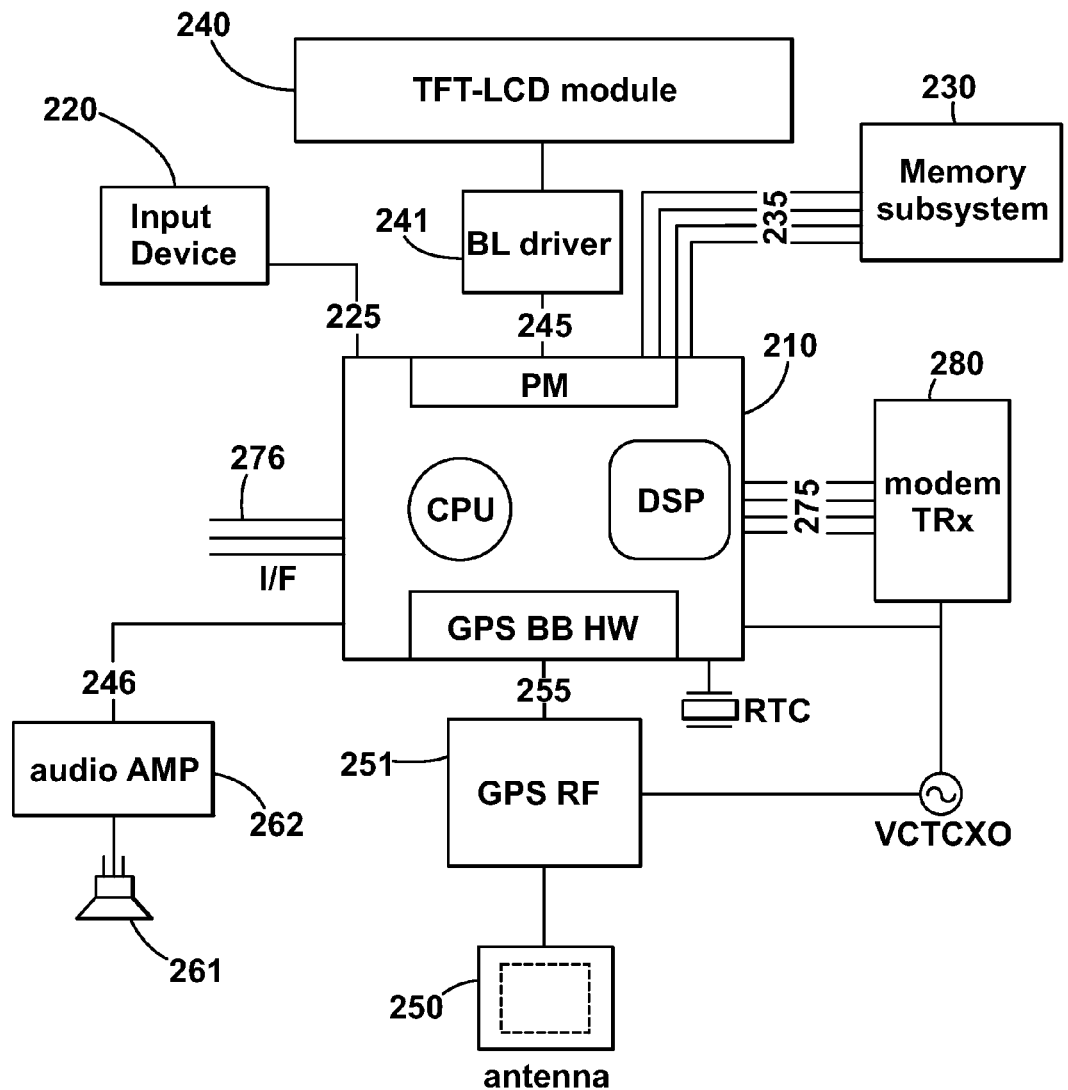
FIG. 3 is a schematic illustration of electronic components arranged to provide a navigation device in accordance with a second embodiment of the invention.

FIG. 3 shows another embodiment of the electronic components of the navigation device. In this embodiment like reference numerals have been given to components that are the same or similar to components of the embodiment shown in FIG. 2. This embodiment differs from the embodiment shown in FIG. 3 in that the cellular modem 280 is integral with the navigation device. The mobile phone technology within the navigation device 200 can include internal components as specified above, and/or can include an insertable card (e.g. Subscriber Identity Module or SIM card), complete with necessary mobile phone technology and/or an antenna for example. It will be understood, however, that a SIM card may not be necessary as the invention does not require the subscription to a cellular network.

Figure 4:
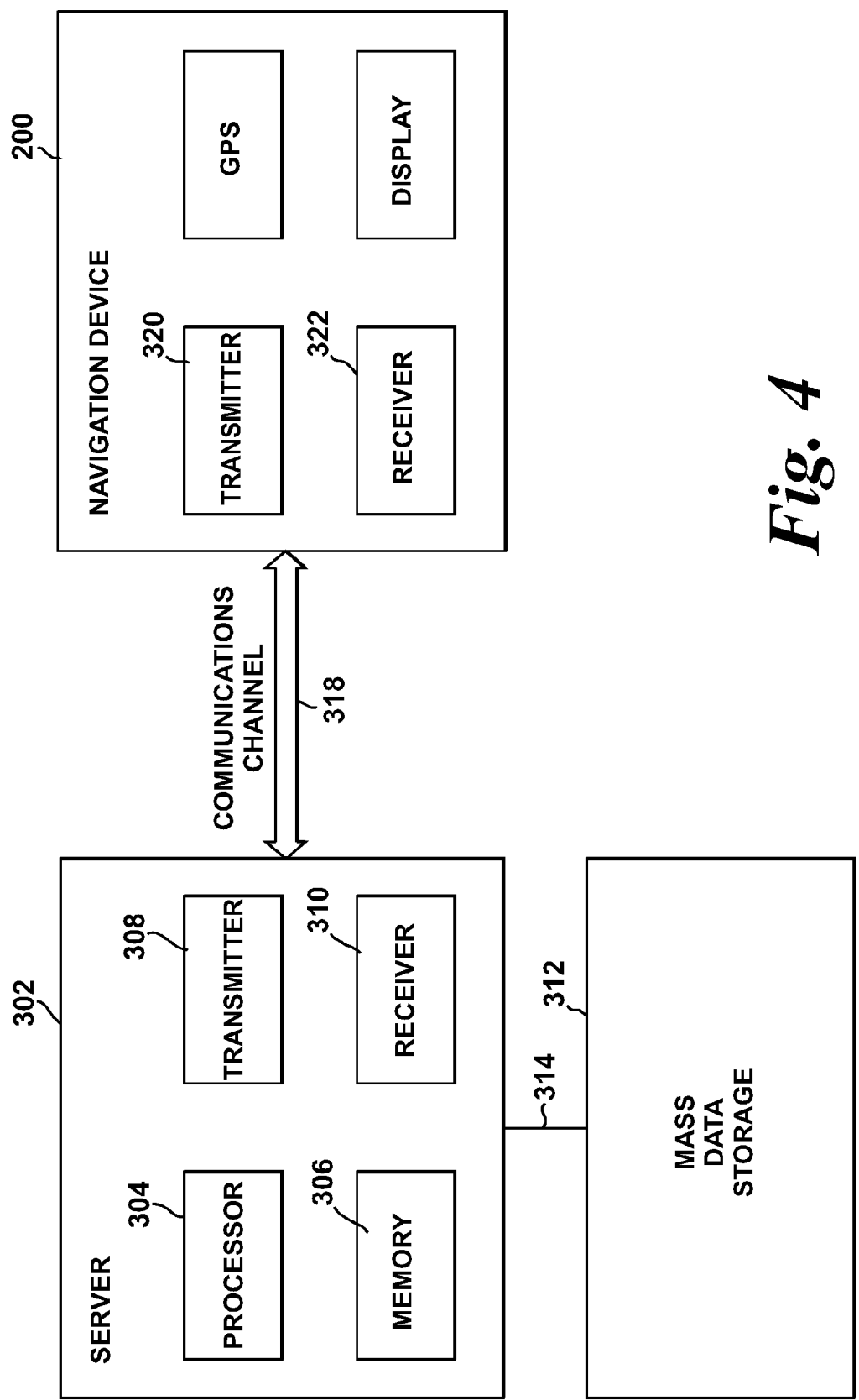
FIG. 4 is a schematic illustration of the manner in which a navigation device may receive information from a server over a wireless communication channel.

Referring now to FIG. 4, the navigation device 200 may establish a "mobile" or telecommunications network connection with a server 302 via the cellular modem 280 establishing a digital connection (such as a digital connection via known Bluetooth technology for example). Thereafter, through its network service provider, the cellular device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using the Internet (such as the World Wide Web) for example, can be done in a known manner. This can include use of TCP/IP layered protocol for example. The mobile device can utilize any number of communication standards such as DVB-H, DVB-T, CDMA, GSM, Wi-Max, TMC/RDS, etc.

As such, an Internet connection may be utilised which is achieved via data connection, via a mobile phone or mobile phone technology within the navigation device 200 for example. For this connection, an Internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the Internet).

The navigation device 200 can further complete a data connection with the mobile device, and eventually with the Internet and server 302, via existing Bluetooth technology for example, in a known manner, wherein the data protocol can utilize any number of standards, such as the GSRM, the Data Protocol Standard for the GSM standard, for example.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 4 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processing device 304 operatively connected to a memory 306 and further operatively connected, via a wired or wireless connection 314, to a mass data storage device 312. The processing device 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processing device, memory, etc. as previously described with regard to FIGS. 2 and 3, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processing device 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processing device 304 in the server 302 may be used to handle the bulk of the processing needs; however, processing device 210 of navigation device 200 can also handle much processing and calculation, oftentimes independent of a connection to a server 302.

FIGS. 5A and 5B are perspective views of a navigation device 200. As shown in FIG. 5A, the navigation device 200 may be a unit that includes an integrated input and display device 290 (a touch panel screen for example) and the other components of FIGS. 2 and 3 (including but not limited to internal GPS receiver 250, processing device 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 5B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 5B.

To release the connection between the navigation device 200 and the docking station, a button on the navigation device 200 may be pressed, for example. Other equally suitable arrangements for coupling and decoupling the navigation device to a docking station are well known to persons of ordinary skill in the art.

When this user switches on their PND, the device acquires a GNSS fix and calculates (in a known manner) the current location of the PND. Using this current location the PND can determine a navigable route in accordance with conventional algorithms and provide directions to a user.

Figure 6:
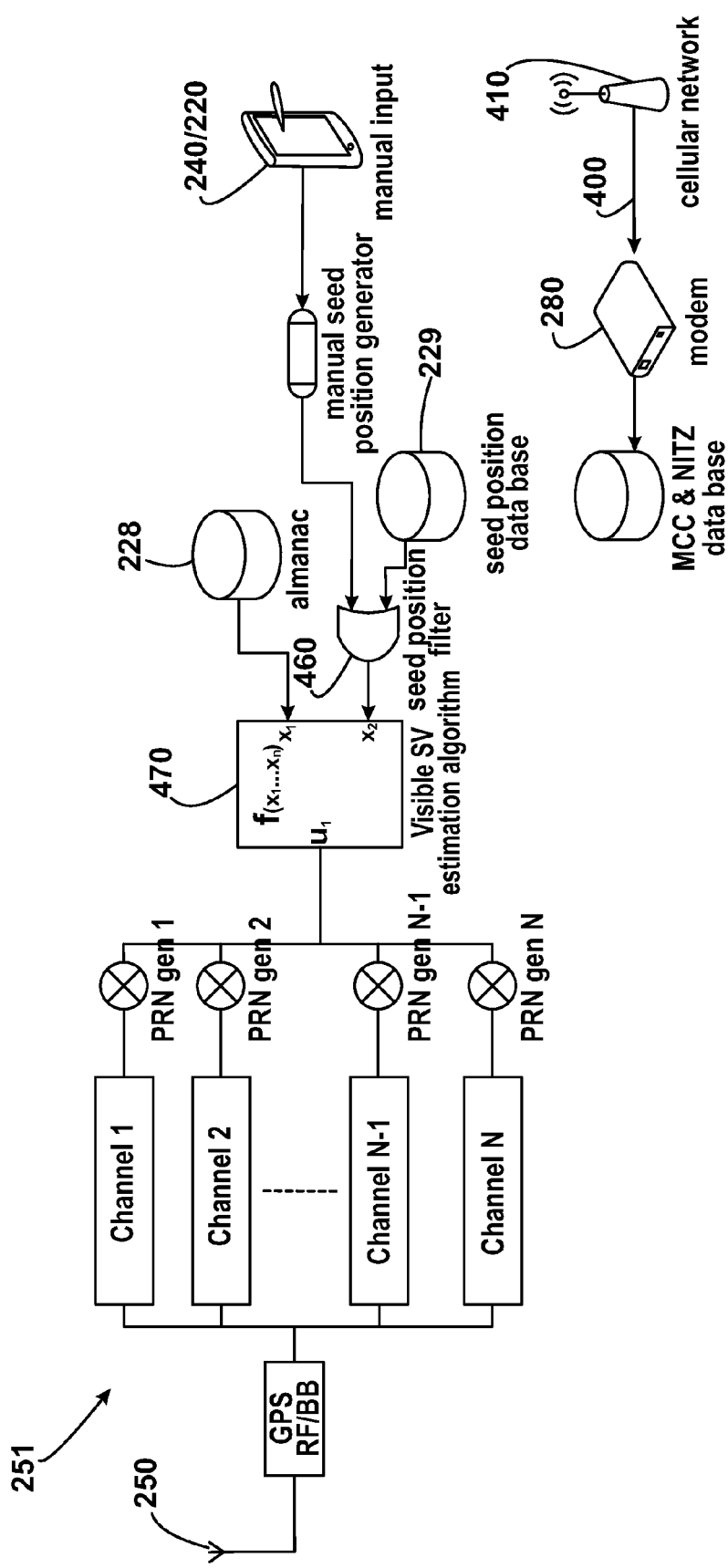
FIG. 6 is a data transition diagram of one embodiment of the invention.
Figure 7:
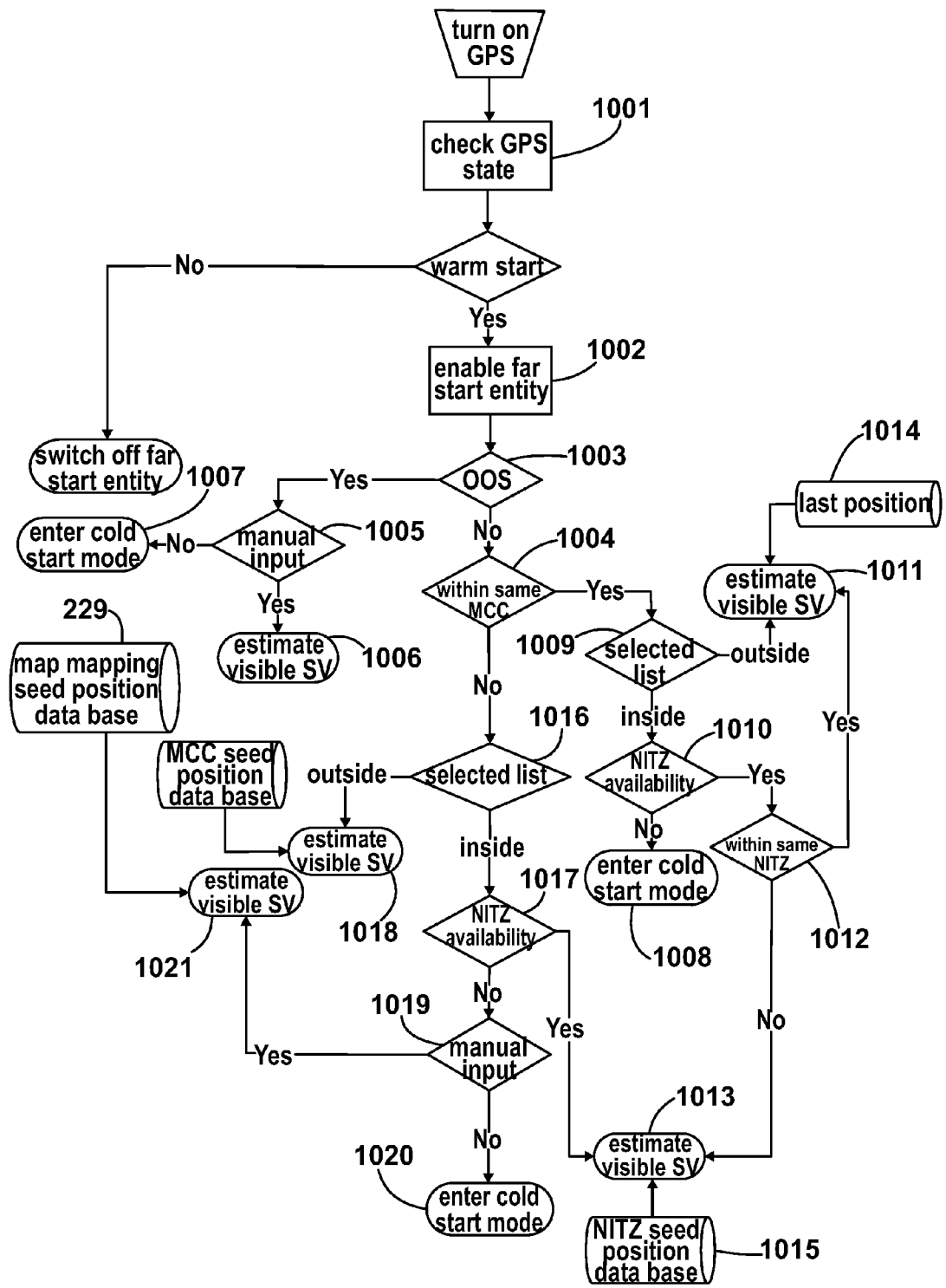
FIG. 7 is a flowchart of a method according to one embodiment of the invention.
Figure 8:
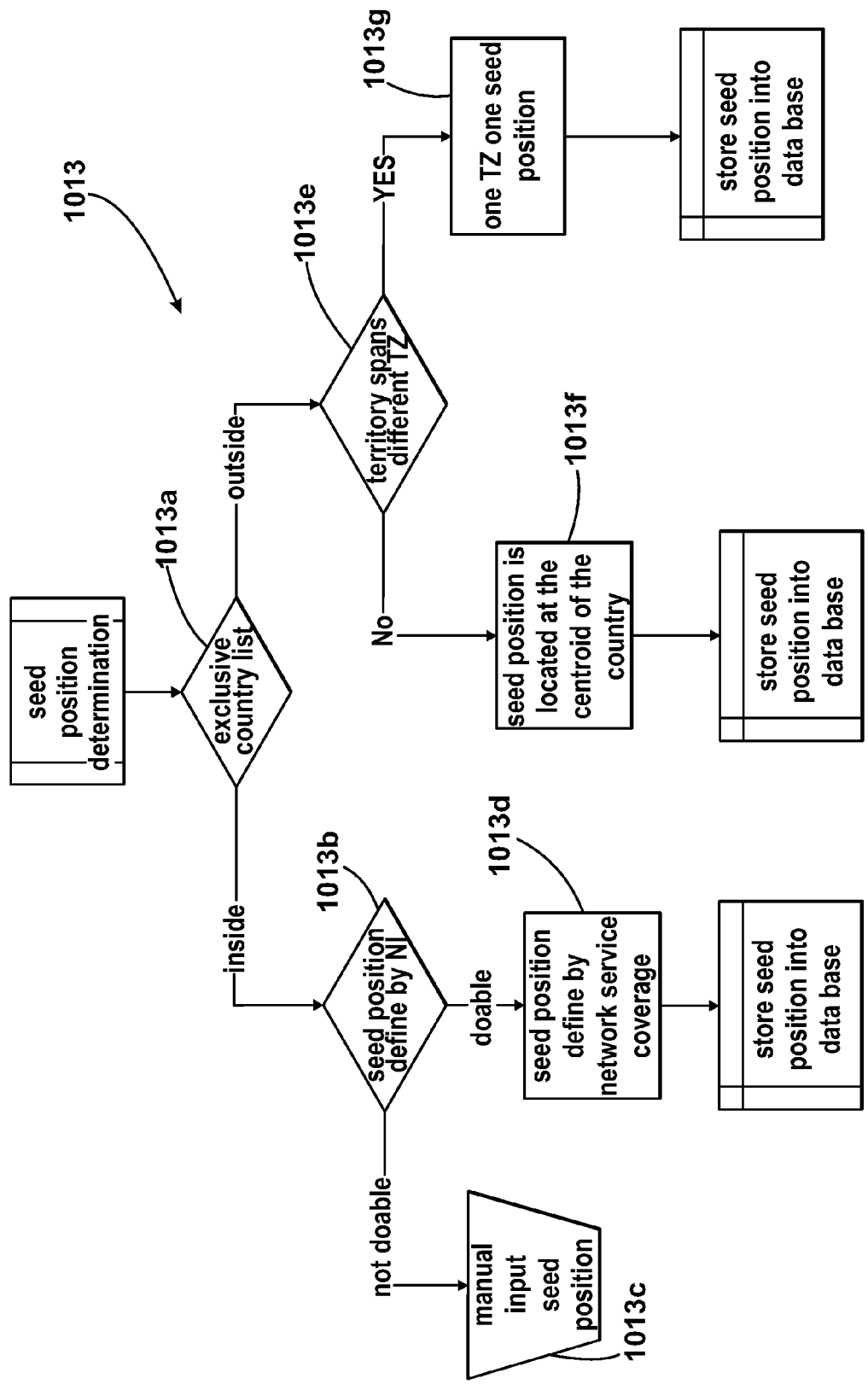
FIG. 8 is a flowchart showing a method of determining a seed position in accordance with an embodiment of the invention.

Referring to FIGS. 6 to 8, in order to locate a first position fix when the PND is switched on, in step 1001 the PND checks to determine if the PND is in a warm start mode. If the PND is in the warm start mode, the PND's far start algorithm, as disclosed below, is carried out, whereas, if the PND is not in the warm start mode, the PND will carry out a cold start, i.e. as search for satellites from scratch, on being switched on.

If at step 1001 it is found that the PND is in the warm start mode, the processing device 210 causes 1002 the modem 280 to receive a broadcast signal, such as a BCCH 400, broadcast by base stations 410. In step 1003, if the modem 280 is unable to receive a BCCH, the algorithm goes to step 1005, so called OOS mode, else it goes to step 1004, so called non-OOS mode. In OSS mode, the processing device 210 controls the display 240 to display a request and receive a user input of current location information. In step 1006, the processing device 210 determines a seed position and estimates the GNSS satellites visible from that location. This may be carried out by comparing the seed position to satellite information correlated with seed position stored in memory 230. From the estimate of visible satellites, the GNSS satellites are located by the GNSS receiver 251. If course position information is available, an algorithm for estimating the visible satellites generates pseudo-random numbers (PRNs) for the visible satellites by using both the seed position and information in an almanac 228, for example stored in memory 230. If no user input is received, the algorithm goes to step 1007 wherein the visible satellites are searched for from scratch (cold start mode).

Figure 13:
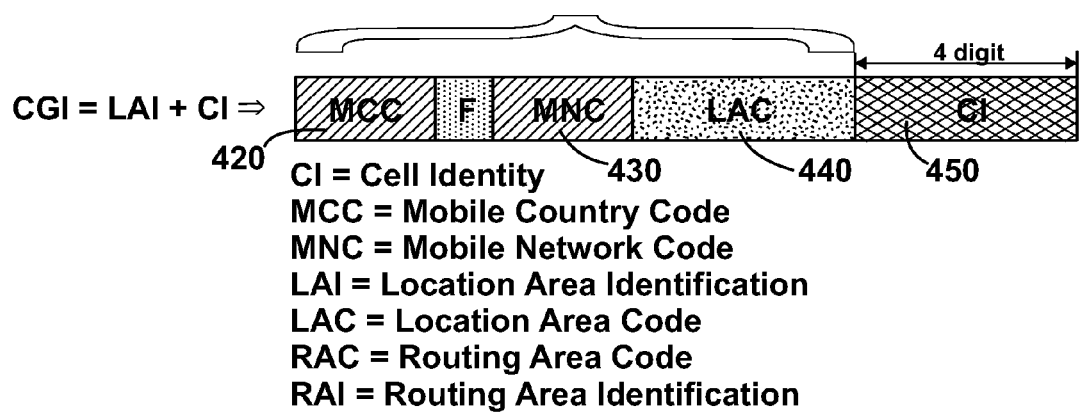
FIG. 13 is a schematic diagram of a data format of a control signal of a cellular network.

If the modem 280 is able to receive a BCCH, the algorithm goes to step 1004. Referring to FIG. 13, a BCCH is used to convey all cell specific information to cellular devices that are currently camping in the cell (area covered by the base station 410). The cell specific typically comprises a Mobile Country Code (MCC) each country/territory or geographical area having a unique MCC, a Mobile Network Code (MNC) 430, a location area code (LAC) 440 and a cell identity (CI) 450.

In step 1008, the processing device 210 obtains the current MCC from the BCCH and compares the current MCC to a previous MCC stored in memory 230 that was last received by the PND, for example when the PND was last switched on.

If the current MCC is the same as the previous MCC, the algorithm goes to step 1009, where the processing device 210 checks the MCC against a selected list of countries stored in memory 230, which are countries that do not have a unique seed position from which an estimate of visible satellites can be made because of the countries longitudinal and/or latitudinal extent. In one embodiment, the selected list of countries comprises Russian Federation, Canada, People's Republic of China, United States of America, Federative Republic of Brazil, Commonwealth of Australia, Republic of India, Argentine Republic, Republic of Kazakhstan, Republic of Sudan, Republic of Chile, People's Democratic Republic of Algeria, Republic of Indonesia, Greenland and Democratic Republic of Congo.

If the current MCC corresponds to a country/territory in the list then the algorithm goes to step 1010, whereas if the current MCC does not correspond to a country/territory in the list, the algorithm goes to step 1011. In step 1010, the processing device 210 commands the modem 280 to decode the current Network Identity and Time Zone information (NITZ) of the BCCH. If NITZ information is not available the processing device 210 causes the GNSS receiver 250/251 to enter a cold start mode 1008 wherein the visible satellites are searched for from scratch.

Stored in memory 230 is previous NITZ information determined when the PND was last switched on and, in step 1012, the processing device 210 compares the current NITZ information to the previous NITZ information and if the NITZ information is the same, the algorithm goes to step 1011 otherwise the algorithm goes to step 1013.

In step 1011, the processing device retrieves last position information 1014 and information from an almanac 228 stored in memory 230 and an estimate of the visible satellites, including generation of a PRN list, is carried out using the last position information 1014 and the almanac information 228.

In step 1013, an estimate of the visible satellites is made by determining a seed position, i.e. an approximate location of the PND, from the MCC and NITZ information, and a PRN list for visible satellites is generated from the seed position and the stored almanac 228. The seed position may be obtained by comparing the NITZ information to a database 1015 that correlates NITZ information to seed positions. An embodiment of how the seed position is determined based on the NITZ information is described below with reference to FIG. 8.

Returning to step 1004, if the current MCC is not the same as the previous MCC, the algorithm goes to step 1016. In step 1016, the processing device 210 checks the MCC against the selected list of countries stored in memory 230.

If the current MCC corresponds to a country/territory in the list then the algorithm goes to step 1017, whereas if the current MCC does not correspond to a country/territory in the list, the algorithm goes to step 1018. In step 1017, the processing device 210 commands the modem 280 to decode the current Network Identity and Time Zone information (NITZ) of the BCCH. If NITZ information is not available the processing device 210 causes in step 1019 the PND 200 to request input of location information by a user and, if a user input is not received, the GNSS receiver 250/251 to enter a cold start mode 1020 wherein the visible satellites are searched for from scratch.

If a manual input of location information is received, in step 1021 the processing device determines a seed position, for example by map matching the location information to a seed position using map matching seed position database 1022 stored in memory 230. Database 1022 correlates locations to seed positions. From the determined seed position and the stored almanac, an estimate of the visible satellites and a PRN list is generated for visible satellites.

If NITZ information is available in step 1017, the algorithm carries out step 1013 as described above.

Referring to FIG. 8, how the seed position is determined in step 1013 is shown in more detail. In step 1013*a*, the MCC is compared to an exclusive (second) list or countries whose longitudinal extent is such that the country/territory does not have a unique seed position. For example, the exclusive list may be People's Republic of China, Republic of India, Argentine Republic, Republic of Sudan, Republic of Chile, People's Democratic Republic of Algeria.

If the MCC corresponds to a country/territory not on the exclusive list, a seed position is determined from the time zone (TZ) information. If the MCC corresponds to a country/territory on the exclusive list, a seed position is determined from network coverage information determined itself from one or more the network identities (NI). In step 1013b, the processing device 210 determines whether the network identity can be used to determine a seed position. Again, this may be achieved through comparison of the network identities to a database that identifies the network identities for which a seed position is defined. If it is not possible to determine a seed position from the network identities, the PND requests, in step 1013c, manual input of location information from the user. If it is possible to determine a seed position from the network identities, the algorithm goes to step 1013d wherein a seed position is determined from the network identities. An example of how this may be achieved will now be described with reference to FIGS. 10 to 12.

The Republic of Chile is one country that does not have a unique seed position because of its longitudinal extent (the GNSS satellites visible in the south of the country are different to those visible in the north due to the curvature of the Earth). Accordingly, a further subdivision of this country has to be achieved based on the PND's position. It is not possible to determine an approximate position of the PND from the time zone information because Chile lies within a single time zone. Accordingly, information on the cellular networks from which the PND can receive control signals is used to determine an approximate location of the PND and therefore, a seed position.

Figure 9:
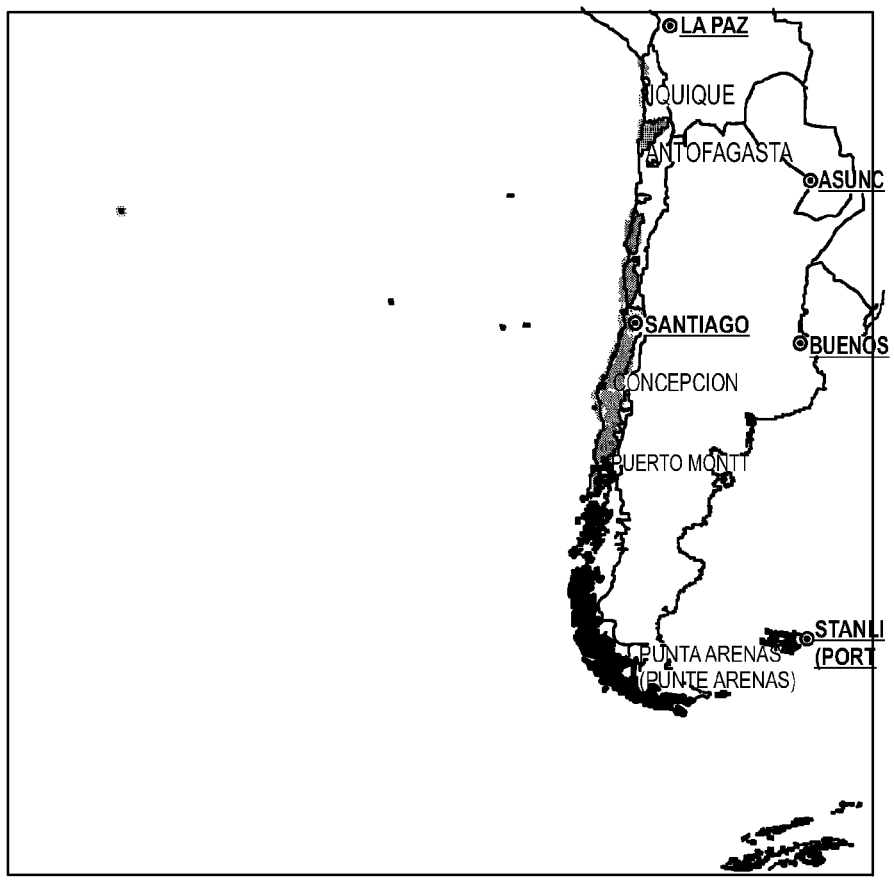
FIGS. 9 to 11 are maps of Chile illustrating the cellular network coverage of different networks.
Figure 10:
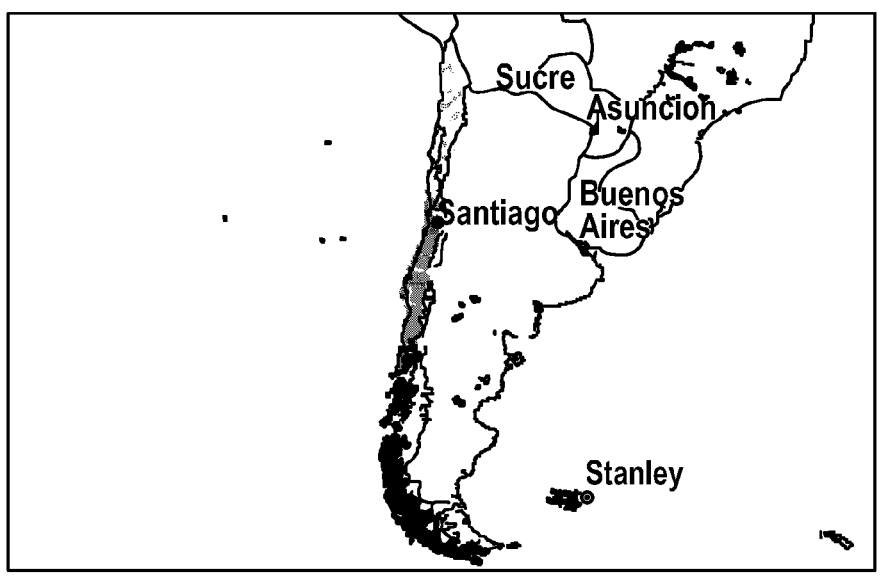
Figure 11:
Figure 12:
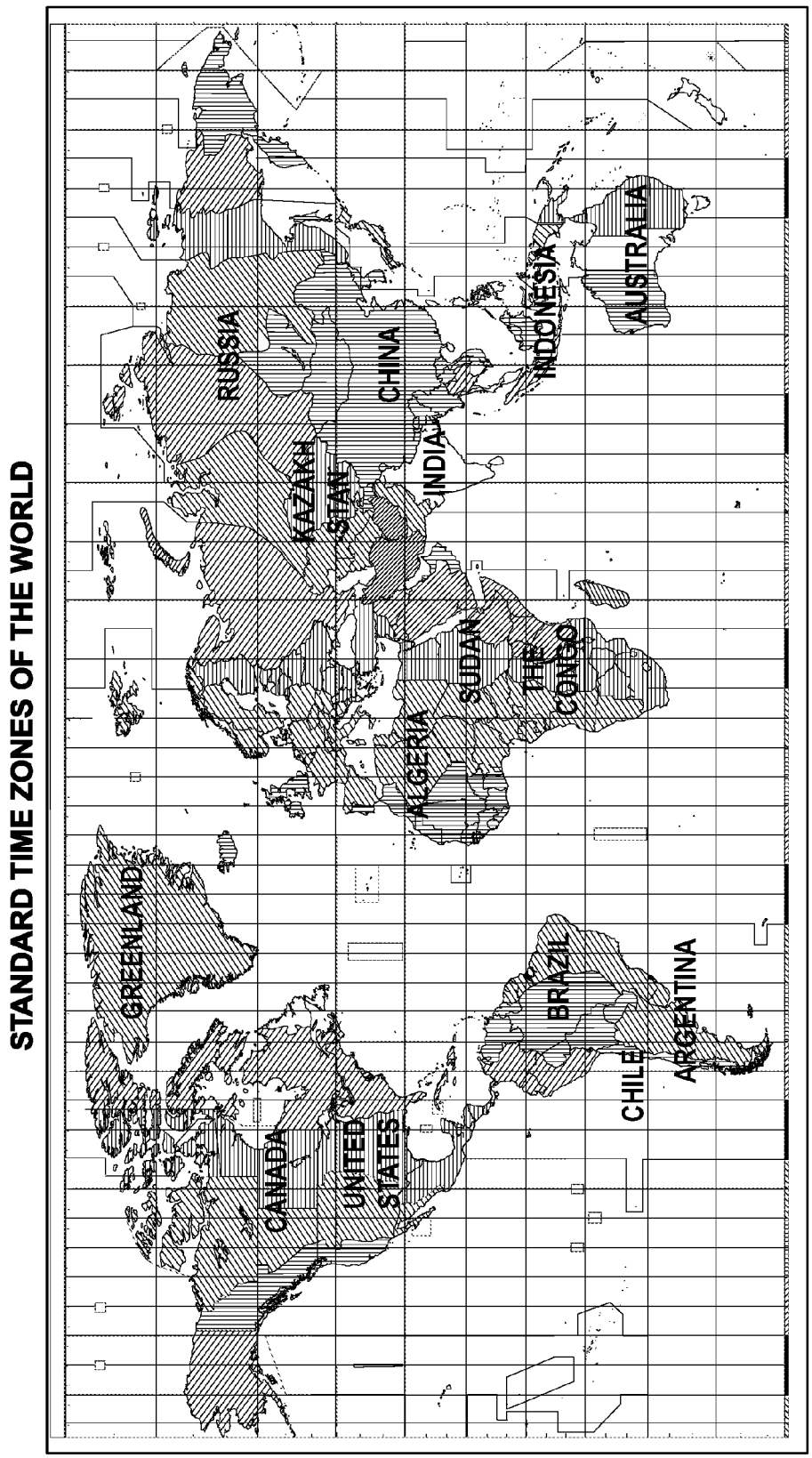
FIG. 12 is a map of the world showing the standard time zones.

FIGS. 9 to 11 show the coverage of different cellular networks, namely ENTEL PCS, ENTEL TELEFONIA MOVIL and Telefonica Movil De Chile, across Chile. As can be seen from the Figures, all 3 networks are available in central Chile, whereas in the north, the coverage of ENTEL TELEFONIA MOVIL and Telefonica Movil De Chile are limited to large cities, whilst ENTEL PCS covers most of the north of Chile. For the south, only Telefonica Movil De Chile and ENTEL PCS are available. Accordingly, the processing device 210 is arranged to identify the network identities of the BCCH signals that are used and determine from the network identities an approximation of the position of the PND in the country/territory. For example, if no BCCH signal is received for ENTEL TELEFONIA MOVIL, the PND is likely to be in south Chile, whereas if BCCH signals from all three networks are received, the PND is most likely to be in central Chile. If a BCCH is only received for ENTEL PCS, the PND is likely to be in north Chile.

The memory 230 has stored therein a database of seed positions for different combinations of network coverage, for example for Chile three seed positions, and the processing device identifies a seed position from the identified network coverage information from the database. For example, the seed position may be a centroid for north, south and central Chile.

As described above, the seed position is used together with the almanac 229 to determine an estimate of the visible satellites and a PRN list.

Referring back to FIG. 8, if the MCC corresponds to a country/territory not on the exclusive list, a seed position is determined from the time zone (TZ) information. In step 1013e, the processing device 210 determines whether the country/territory spans more than one time zone. This may be carried out using a database (first list) of countries/territories that span more than one time zone stored in memory 230. For example, the list of countries may be Russian Federation, Canada, United States of America, Federative Republic of Brazil, Commonwealth of Australia, Republic of Kazakhstan, Republic of Indonesia, Greenland and Democratic Republic of Congo. FIG. 9 is a map of the world showing the countries that extend across more than one time zone.

If the country/territory does not span more than one time zone, the processing device goes to step 1013f, wherein a seed position is determined from the country/territory, for example the seed position may be a centroid of the country/territory. As described above, the seed position is used together with the almanac 228 to determine an estimate of the visible satellites and a PRN list.

If the country/territory does span more than one time zone, the processing device goes to step 1013g, wherein time zone (TZ) information is obtained from the BCCH received by modem 280.

A seed position is then determined from the country/territory and the time zone information, for example the seed position may be a centroid of the area bordered by the time zone and the borders of the country/territory. As described above, the seed position is used together with the almanac 228 to determine an estimate of the visible satellites and a PRN list.

Once an estimate of visible satellites and a PRN list has been generated, a first position fix can be established. It is believed that by generating an estimate of the visible satellites and PRN list using the above method may greatly reduce the time to first fix (TTFF).

FIG. 6 illustrates the flow of data through the system 200. Location information is received by the system 200, through user input device 220, for example a touch screen, and a cellular modem 280 that receives control signals, such as BCCH, from base stations 410 of a cellular network. From the BCCH, MCC and NITZ information is obtained and this information together with manual input, if any, is used to identify a seed position, shown in this diagram as a seed position filter 420. An algorithm 470 estimates the visible satellites using the determined seed position and information on the satellites stored in an almanac 228 and the results of this estimation are then used by GPS receiver 250/251 having N channels to generate a fix based on the location.

Figure 14:
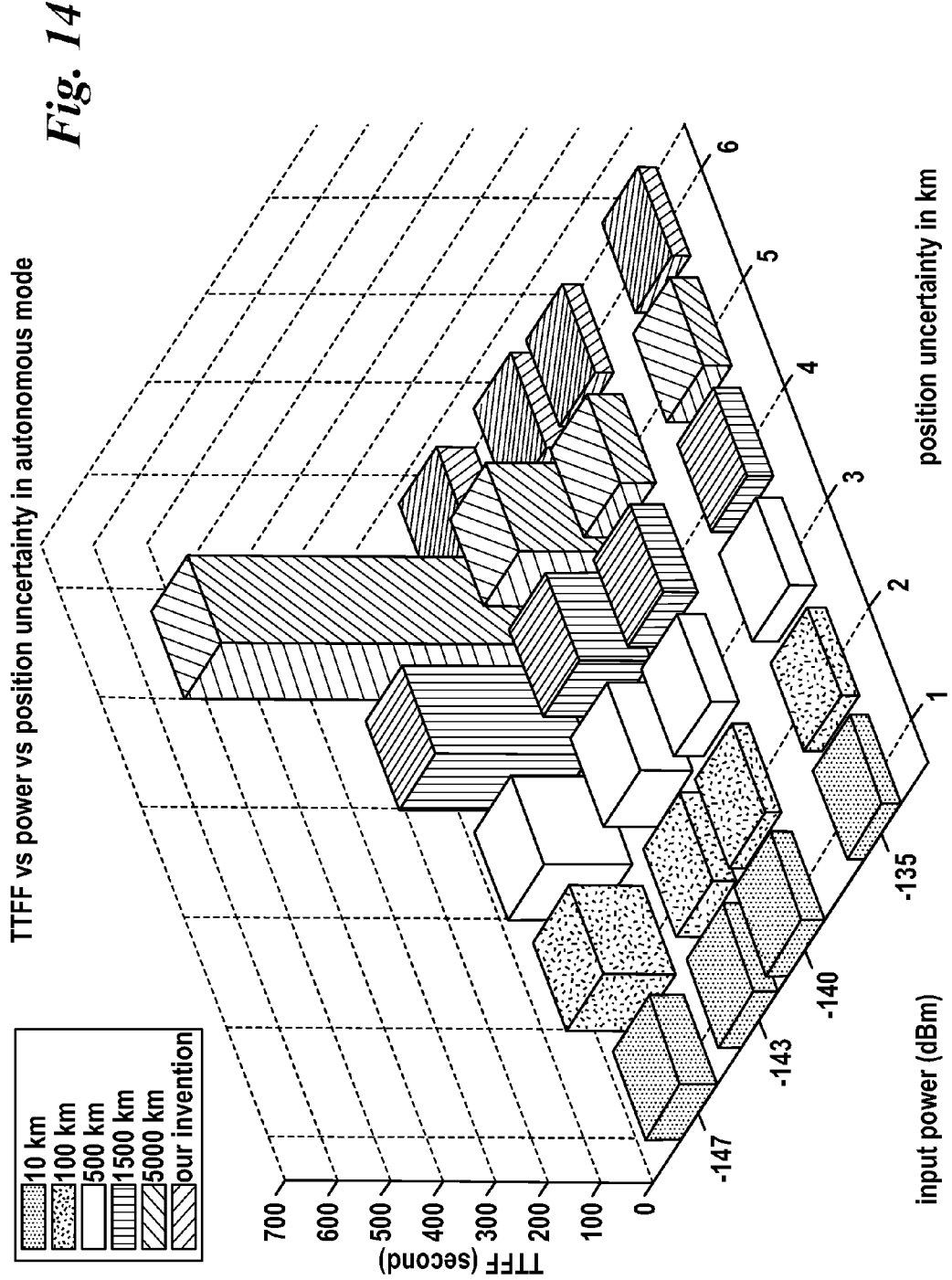
FIG. 14 is a graph illustrating TTFF versus power versus position uncertainty for a navigation device according to an embodiment of the invention and the prior art Qualcomm QST1105 solution.
Figure 15:
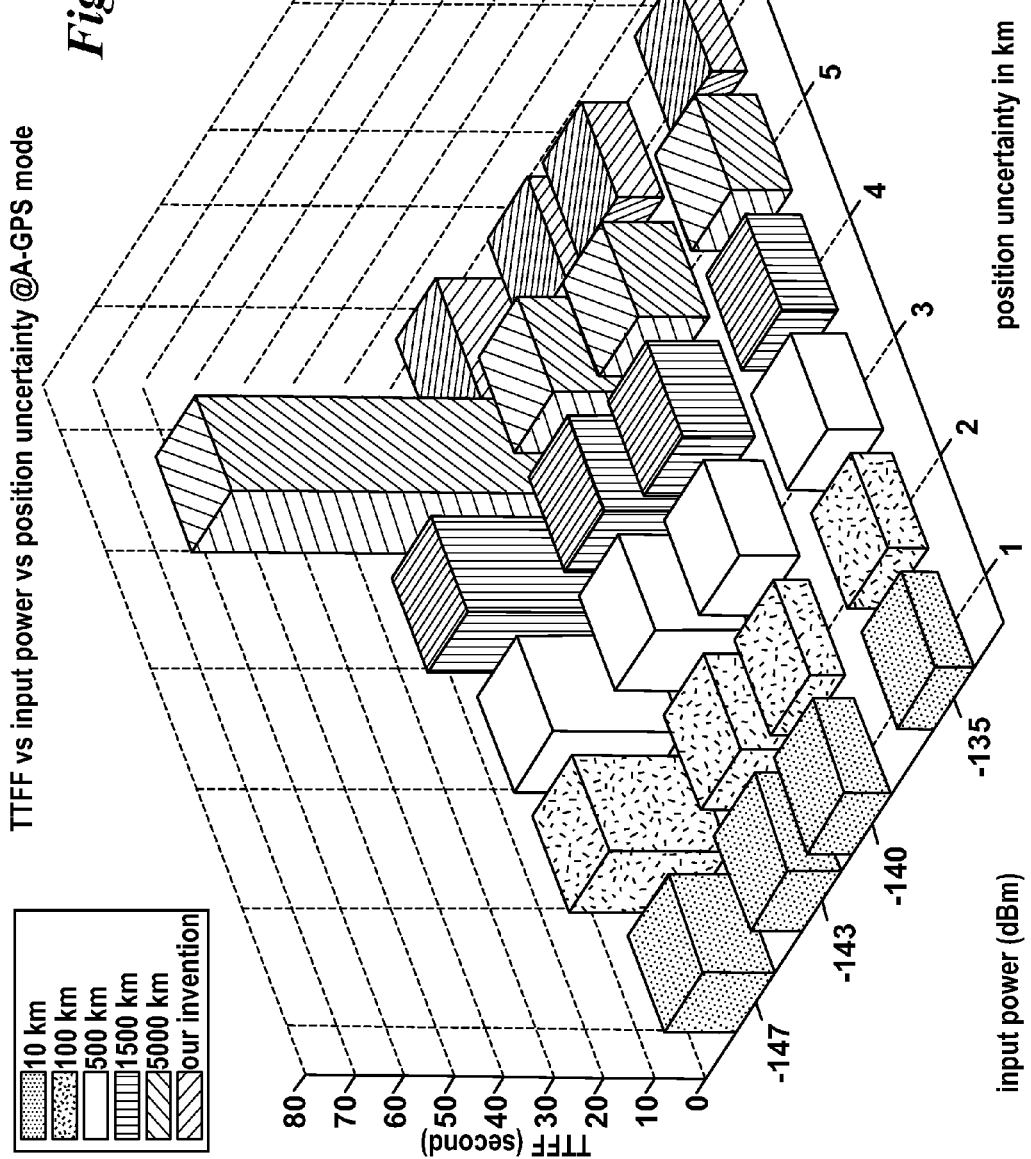
FIG. 15 is a graph illustrating TTFF versus power versus position uncertainty for a navigation device according to an embodiment of the invention and A-GPS.
Figure 16:
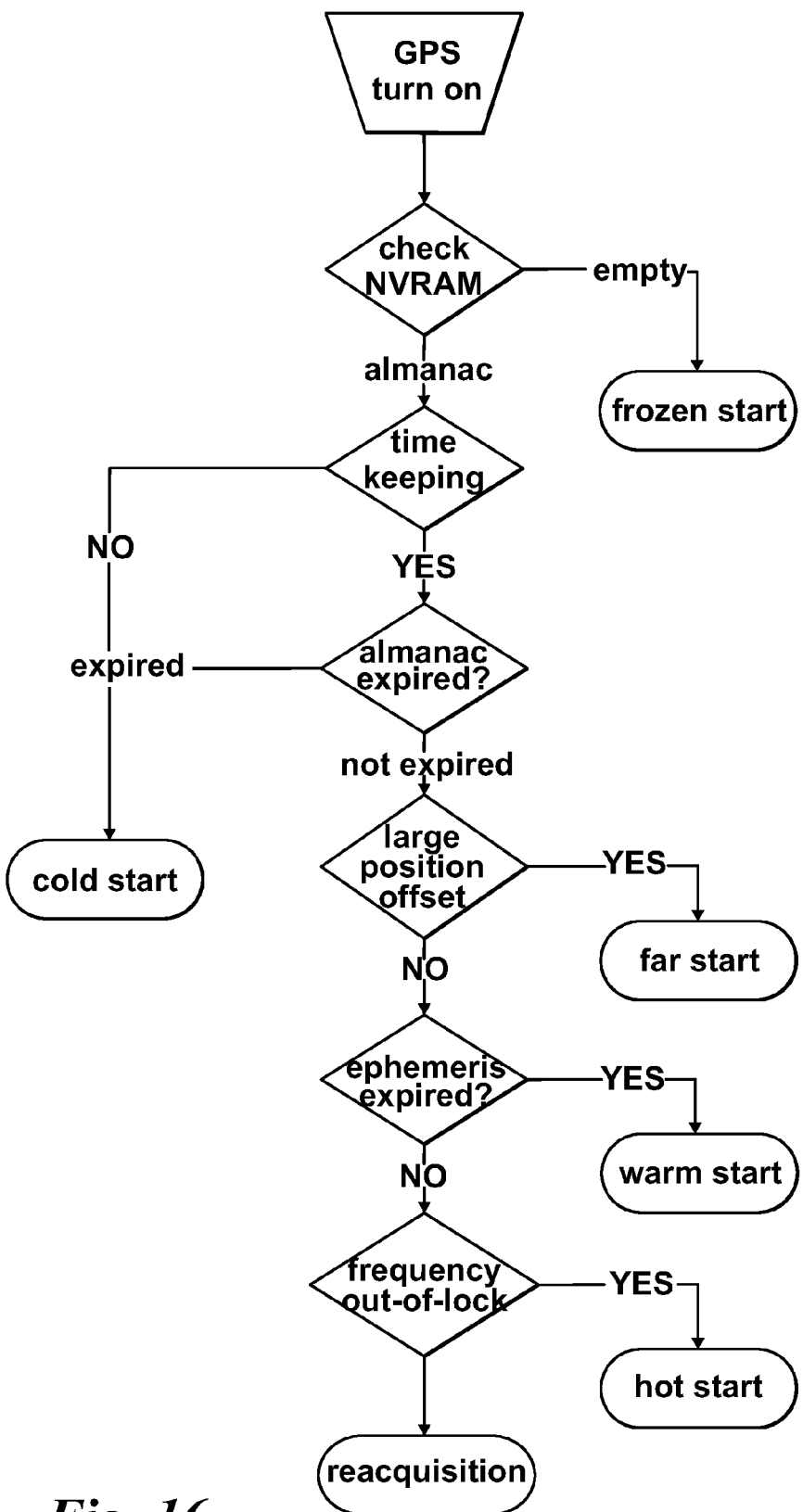
FIG. 16 is a flowchart showing a prior art method of locating satellites.

Now referring to FIGS. 14 and 15, the Figures show 3-D bar graphs of TTFF versus input power versus position uncertainty (for the GNSS receiver) for the methods used by Qualcomm QST1105, a method used for A-GPS and a method according to an embodiment of the invention. The tables below show the values used for the graphs. As can be seen, the TTFF for the invention is significantly shorter than the conventional methods, particularly as the uncertainty in the position (i.e. distance the PND has travelled when switched off) of the GNSS receiver increases.

As can be seen from the graphs, the TTFF could be reduced by as much as 9 times over that of the conventional methods.

TABLE 1

| TTFF simulation data - Qualcomm mode | | | | | | | |
|---|---|---|---|---|---|---|---|
| Power | position uncertainty (km) | | | | | Our | TTFF reduction |
| (dBm) | 10 | 100 | 500 | 1500 | 5000 | invention | factor |
| −135 | 32 | 33 | 48 | 49 | 53 | 33 | 1 to 1.6 |
| −140 | 36 | 32 | 53 | 63 | 66 | 33 | 1 to 2 |
| −143 | 43 | 44 | 101 | 138 | 172 | 47 | 1 to 3.7 |
| −147 | 64 | 137 | 168 | 294 | 621 | 71 | 0.9 to 8.7 |

TABLE 2

TTFF simulation data - AGPS mode

| Power | position uncertainty (km) | | | | | Our | TTFF reduction |
|---|---|---|---|---|---|---|---|
| (dBm) | 10 | 100 | 500 | 1500 | 5000 | invention | factor |
| −135 | 7 | 8 | 11 | 11 | 12 | 7 | 1 to 1.7 |
| −140 | 8 | 7 | 12 | 14 | 14 | 9 | 0.8 to 1.6 |
| −143 | 10 | 11 | 19 | 20 | 21 | 10 | 1 to 2.1 |
| −147 | 14 | 24 | 26 | 34 | 72 | 15 | 0.9 to 4.8 |

It will be understood that the above described algorithm may be embodied in software or hardware or a combination of software and hardware.

It will be understood that the invention is not limited to the above described embodiments of the invention but includes modifications that fall within the scope of the claims. For example, the PND may use other broadcast signals in order to determine seed positions from which an estimate of GNSS satellites can be made. For example, the cellular modem 280 could be replaced with a television receiver, radio receiver or other receiver for receiving broadcast signals comprising time information, wireless network coverage information and/or other suitable location information. For example, the processing device 210 may be arranged to determine a seed position based on the television and/or radio networks from which the receiver can receive signals or time information included in the television or radio signals.

The invention claimed is:

1. A navigation device comprising:
a global navigation satellite system (GNSS) receiver for receiving GNSS signals broadcast by satellites of a GNSS,
memory having stored thereon a list of selected countries, wherein the list of selected countries comprises a first list that comprises a list of countries that extend across more than one time zone and a second list that comprises a list of countries that require more than one seed position because of the countries length, wherein the list of selected countries further comprises a second list that comprises a list of countries that require more than one seed position because of the countries length,
a wireless receiver or a connection arranged to be connected to a wireless receiver for receiving broadcast signals transmitted by base stations of a wireless network and a processing device arranged to at least:
i) obtain information on a country in which the navigation device is located;
ii) determine whether the country comprises more than one time zone using the first list;
iii) determine whether the country requires more than one seed position because of the country's length using the second list;
iv) upon the determination that the country does comprise more than one time zone, obtain information from the broadcast signals transmitted by the base stations on a time zone in which the navigation device is located, determine a seed position from the time zone information; and control the GNSS receiver to acquire GNSS satellites based on the determined seed position; and
v) upon the determination that the country does require more than one seed position because of the country's length, determine a seed position from information associated with an identity of wireless networks; and control the GNSS receiver to acquire GNSS satellites based on the determined seed position.

2. A navigation device according to claim 1, wherein the seed position is a centroid of an area defined by a time zone and borders of a country/territory.

3. A navigation device according to claim 1, wherein the processing device is arranged to:
a) for the current location, obtain information on the identity of the wireless network(s) from which the wireless receiver can receive broadcast signals;
b) determine a seed position from the information on the identity of the wireless network(s); and
c) control the GNSS receiver to acquire GNSS satellites based on the determined seed position.

4. A navigation device according to claim 3, wherein the seed position determined in step (b) is a centroid of an area defined by wireless network coverage and borders of a country/territory.

5. A navigation device according to claim 3, wherein the processing device is arranged to:
i) identify from the broadcast signal a country code and identify a country/territory using the country code,
ii) if the identified country/territory is in an exclusive list of countries, then obtain information on the identity of the wireless network(s) from which the wireless receiver can receive broadcast signals and determine a seed position from the information on the identity of the wireless network; else, if the identified country/territory extends across more than one time zone then obtain information on a time zone from the broadcast signal transmitted by base stations and determine a seed position from the country code and the time zone information; else determine a seed position from the country code only; and
iii) control the GNSS receiver to acquire GNSS satellites based on the determined seed position.

6. A navigation device according to claim 5, wherein i) if the country code is the only available information, the seed position is the centroid of the country/territory, ii) if the country is not in the exclusive list and both country code and time zone information is available, the seed position is the centroid of the area defined by the borders of the country and the time zone, iii) if the country is in the exclusive list and both country code and network coverage information is available, the seed position is at the centroid of the network coverage, and iv) if the country is in the exclusive list and network coverage information is unavailable, the seed position is the centroid of the country.

7. A navigation device according to claim 6, comprising a user input and the processing device is arranged to obtain information on a location of the GNSS device from the user input and determine a seed position from the location information.

8. A navigation device according to claim 1, the processing device is arranged to identify from the broadcast signal a country code and, based on whether the country/territory associated with the identified country code corresponds to one of the countries in the list of selected countries, determine the seed position from at least one of the time zone information and the information on the identity of the wireless network(s).

9. A navigation device according to claim 8, wherein if the country/territory associated with the identified country code corresponds with a country/territory on the first list, the seed position is determined from the time zone information and if the country/territory associated with the identified country code corresponds with a country/territory on the second list, the seed position is determined from the information on the identity of the wireless network(s).

10. A navigation device according to claim 8, wherein the memory comprises a data map that maps the country code, time zone information and/or information on the identity of the wireless networks to seed positions.

11. A navigation device according to claim 1, wherein the selected list of countries comprises one or more of Russian Federation, Canada, People's Republic of China, United States of America, Federative Republic of Brazil, Commonwealth of Australia, Republic of India, Argentine Republic, Republic of Kazakhstan, Republic of Sudan, Republic of Chile, People's Democratic Republic of Algeria, Republic of Indonesia, Greenland and Democratic Republic of Congo.

12. A navigation device according claim 1, wherein, the memory of the navigation device has stored therein previous time zone information and the processing device is arranged to identify from a current broadcast signal received by the wireless receiver current time zone information, and if the current time zone information does not match the previous time zone information, the processing device determines a seed position from the current time zone information, otherwise the processing device controls the GNSS receiver to acquire GNSS satellites based on last position information stored in memory.

13. A navigation device according to claim 1, wherein the list of countries in the first list and the list of countries in the second list are mutually exclusive.

14. A method of locating satellites of a global navigation satellite system (GNSS) visible at a location comprising: receiving broadcast signals emitted by base stations of a wireless network; obtaining information on a country in which the navigation device is located; determining whether the country comprises more than one time zone using a first list that comprises a list of countries that extend across more than one time zone; determining whether the country requires more than one seed position because of the country's length using a second list, wherein the second list comprises a list of countries that require more than one seed position because of the countries' length;
 upon the determination that the country does comprise more than one time zone, obtaining information on a time zone of the location, determining a seed position from the time zone information, and controlling a GNSS receiver to acquire GNSS satellites based on the determined seed position; and
 upon the determination that the country does require more than one seed position because of the country's length, determine a seed position from information associated with an identity of wireless networks; and control the GNSS receiver to acquire GNSS satellites based on the determined seed position.

15. A data carrier having stored thereon instructions that, when executed by a processing device, cause the processing device to carry out the method of claim 14.

* * * * *